US009753305B2

(12) United States Patent
Tavakoli (10) Patent No.: US 9,753,305 B2
(45) Date of Patent: Sep. 5, 2017

(54) COUPLING ELEMENT COMPRISING PRECIOUS METAL ADAPTED FOR COUPLING AN EYEWEAR FRAME WITH A TEMPLE

(71) Applicant: Pouya Tavakoli, Beverly Hills, CA (US)

(72) Inventor: Pouya Tavakoli, Beverly Hills, CA (US)

( * ) Notice: Subject to any disclaimer, the term of this patent is extended or adjusted under 35 U.S.C. 154(b) by 43 days.

(21) Appl. No.: 14/634,807

(22) Filed: Feb. 28, 2015

(65) Prior Publication Data

US 2017/0031175 A1    Feb. 2, 2017

(51) Int. Cl.
| | |
|---|---|
| *G02C 5/00* | (2006.01) |
| *G02C 5/22* | (2006.01) |
| *G02C 1/08* | (2006.01) |
| *G02C 5/14* | (2006.01) |
| *G02C 11/02* | (2006.01) |

(52) U.S. Cl.
CPC .............. *G02C 5/008* (2013.01); *G02C 1/08* (2013.01); *G02C 5/146* (2013.01); *G02C 5/22* (2013.01); *G02C 11/02* (2013.01); *G02C 2200/08* (2013.01)

(58) Field of Classification Search
CPC . G02C 1/06; G02C 1/00; G02C 5/008; G02C 5/14; G02C 5/143; G02C 5/22; G02C 11/00; G02C 11/028

USPC ...... 351/41, 83–86, 90, 99, 51, 52, 111, 153
See application file for complete search history.

(56) References Cited

U.S. PATENT DOCUMENTS

| | | | | |
|---|---|---|---|---|
| 4,494,831 A * | 1/1985 | Yaguchi | ............ | B23K 35/3006 351/144 |
| 2014/0244438 A1 * | 8/2014 | Maurer | ............ | G06Q 30/0617 705/26.43 |

FOREIGN PATENT DOCUMENTS

CH            697875 B1 *    3/2009   .......... A44C 27/003

* cited by examiner

*Primary Examiner* — Huy K Mai
(74) *Attorney, Agent, or Firm* — Patrick Reilly (57) ABSTRACT

An eyewear device is presented allowing for a frame, a plurality of temple elements, and a plurality of joining apparatuses. The above-listed elements of the eyewear device are preferably composed of one of a plurality of precious metal alloys. In certain aspects, the frame may be composed of the same precious metal alloys as the plurality of temple elements; in alternate aspects, the frame and temple elements may be composed of different precious metal alloys. The eyewear device may be or comprise a plurality of precious metal alloys, including but not limited to gold, silver and/or palladium. Further presented is a joining apparatus, wherein the elements of the joining apparatus are composed of a precious metal alloy which is harder and/or has a higher specific gravity than that of the frame and temple elements.

25 Claims, 6 Drawing Sheets

COUPLING ELEMENT COMPRISING PRECIOUS METAL ADAPTED FOR COUPLING AN EYEWEAR FRAME WITH A TEMPLE

FIELD OF THE INVENTION

The present invention relates to the production of eyewear. More particularly, the present invention relates to eyewear coupling elements adapted to stably position optical lenses relative to the head of a wearer.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Eyewear has increasingly come to perform both a functional and an aesthetic purposes. The aesthetic benefits of eyewear are valued, particularly by individuals in upper middle class income brackets, as a status symbol which may prove important for wither personal or business reasons. The prior art provides for visually pleasing eyewear in a plurality of shapes, composed of a plethora of materials, but does not provide for the use of precious metal alloys in all aspects of eyewear, including in the joining elements.

The prior art fails to optimally enable the use of precious metal alloys in certain elements of eyewear. There is therefore a long-felt need to provide eyewear comprised entirely of precious metal alloys as a single piece of jewelry on the wearer's face.

SUMMARY AND OBJECTS OF THE INVENTION

Towards these objects and other objects that will be made obvious in light of the present disclosure, an eyewear device is provided which may, in a preferred embodiment of the present invention, include (a.) a first optical lens framing element, the first framing element adapted to firmly enclose the optical lens, the framing element further being composed of a precious metal alloy; (b.) a first temple element, the first temple element being disposed optionally substantively perpendicular to the framing element, when the eyewear device is engaged, or optionally substantively parallel to the framing element, when the eyewear device is in a storage position, the first temple element further being composed of a precious metal alloy which may be different from, or substantively the same as, that of the framing element; and (c.) a first joining device, adapted to allow the first temple element to transition to or between a perpendicular position relative to the framing element, and a parallel position relative to the framing element, or optionally to any angle between substantively perpendicular and substantively parallel, the first joining device further being composed of a precious metal alloy, which precious metal alloy is harder and has a higher specific gravity than those composing the framing element and/or the temple element.

In an optional further embodiment of the present invention, an eyewear device may further comprise (a.) a first optical lens framing element composed of a first precious metal alloy, rotatably coupled to (b.) a first temple element, composed of a second precious metal alloy by means of (c.) a first joining device, composed of a third, harder, precious metal alloy with a higher specific gravity. The first optical lens framing element may further be rotatably coupled to (d.) a second temple element composed of substantively the same precious metal alloy as the first temple element by means of (e.) a second joining device composed of the same precious metal alloy as the first joining device, which is harder and has higher specific gravity than those composing the framing element and/or the temple element This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
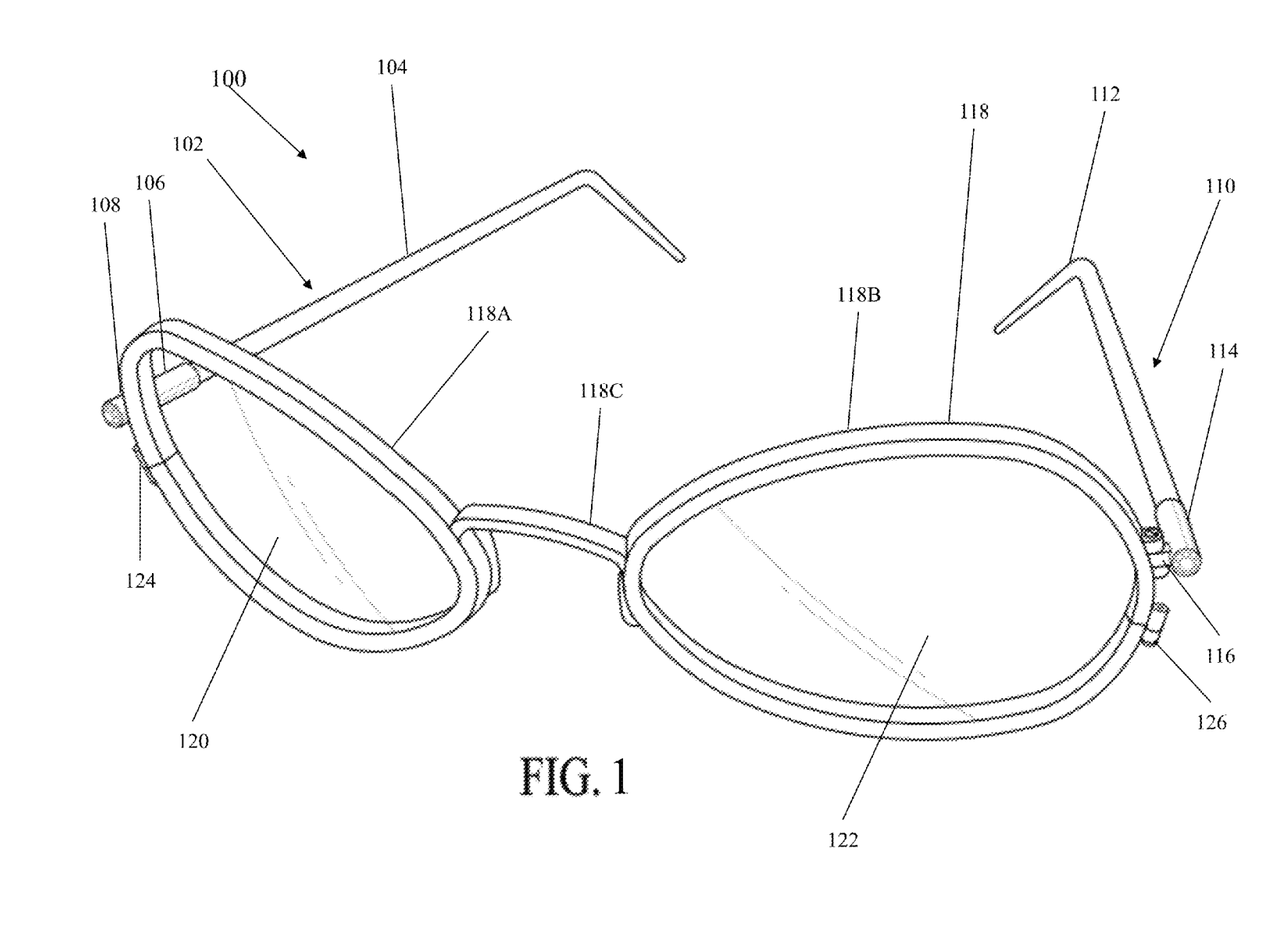
FIG. 1 is a perspective view of a first preferred embodiment of the invented eyewear, comprising a first and a second temple assembly element, a frame element, a first and second frame screw assembly, and a first and second optical lens.

Referring now generally to the Figures and particularly to FIG. 1, FIG. 1 is a perspective view of the invented eyewear 100. The invented eyewear 100 partially comprises a first temple assembly 102. The first temple assembly 102 includes a first arm 104, the first arm 104 being optimally shaped for placement over the ears of a wearer (not shown) for the purpose of snugly holding the invented eyewear 100 on the head of the wearer; a first jewel element 106, disposed in front of the first arm 104; and a first middle temple screw receiver 108, attached to the first jewel element 106. The first arm 104 may optionally be coupled to the first jewel element 106 by means of a friction fit, or alternately by means of an adhesive, or alternately by means of welding, or further optionally by engaging a tapped interior of the first jewel element 106 with a threaded exterior end of the first arm 104. The invented eyewear 100 further comprises a second temple assembly 110. The second temple assembly 110 further includes a second arm 112, the second arm 112 being optimally shaped for placement over the ears of the wearer for the purpose of snugly holding the invented eyewear 100 on the head of the wearer; a second jewel element 114, disposed surrounding the front of the second arm 112; and a second middle temple screw receiver 116. The second arm 112 may optionally be coupled to the second jewel element 114 by means of a friction fit, or alternately by means of an adhesive, or alternately by means of welding, or further optionally by engaging a threaded exterior of the second arm 112 with a tapped interior of the second jewel element 114.

The invented eyewear 100 further includes a frame 118. The frame 118 comprises a first lens holder 118A, a second lens holder 118B, and a nose bridge element 118C, which nose bridge element 118C optimally allows the invented eyewear 100 to rest comfortably on the nose of the wearer. The frame 118 is disposed surrounding and firmly holding in place a first optical lens 120 and a second optical lens 122. A first frame screw assembly 124 is disposed on the first frame 118, and may optionally be disengaged to allow for a removal and/or replacement of the first lens 120, and a second frame screw assembly 126 may optionally be disengaged to allow the second lens 122 to be removed and/or replaced.

In the invented eyewear 100, the frame 118, the first temple assembly 102 and the second temple assembly 110 are optimally composed of a precious metal alloy. The designation "precious metal" may refer to any of the following: gold, silver, platinum, palladium, beryllium, Bismuth, gallium, indium, iridium, germanium, mercury, rhenium ruthenium, rhodium, osmium, and tellurium. The present invention is concerned primarily with jewelry-grade materials, including gold, silver, platinum and/or palladium. The designation "silver" may be assumed to include all types, grades and/or alloys of silver, including but not limited to pure silver and/or sterling silver. The designation "gold" may be assumed to include all types, grades, and/or alloys of gold, including but not limited to white gold, yellow gold, rose gold, pink gold, green gold, and/or purple gold. The frame 118, the first temple assembly 102 and the second temple assembly 110 may optionally be composed of the same precious metal alloy (for example, all composed of sterling silver), or may optionally be composed of distinct precious metal alloys (for example, the frame 118 composed of pure gold, but the first temple assembly 102 and the second temple assembly 110 composed of sterling silver). The first frame screw assembly 124 and the second frame screw assembly 126 are further optimally comprised of a designated precious metal alloy, optionally the same precious metal alloy comprising the frame 118 and/or the same precious metal alloy comprising the first temple assembly 102 and the second temple assembly 110.

In one alternate preferred embodiment of the present invention, the frame 118, the first temple assembly 102 and the second temple assembly 110 are made of silver alloy and the 200, 206, 500 and/or 506 are made of a precious metal alloy that is both harder than and has a higher specific gravity than the silver alloy of which the frame 118, the first temple assembly 102 and the second temple assembly 110 are made of. In a still alternate preferred embodiment of the present invention, the frame 118, the first temple assembly 102 and the second temple assembly 110 are made of silver alloy and the 200, 206, 500 and/or 506 are made of a gold alloy that is both harder than and has a higher specific gravity than the silver alloy of which the frame 118, the first temple assembly 102 and the second temple assembly 110 are made of.

Figure 2:
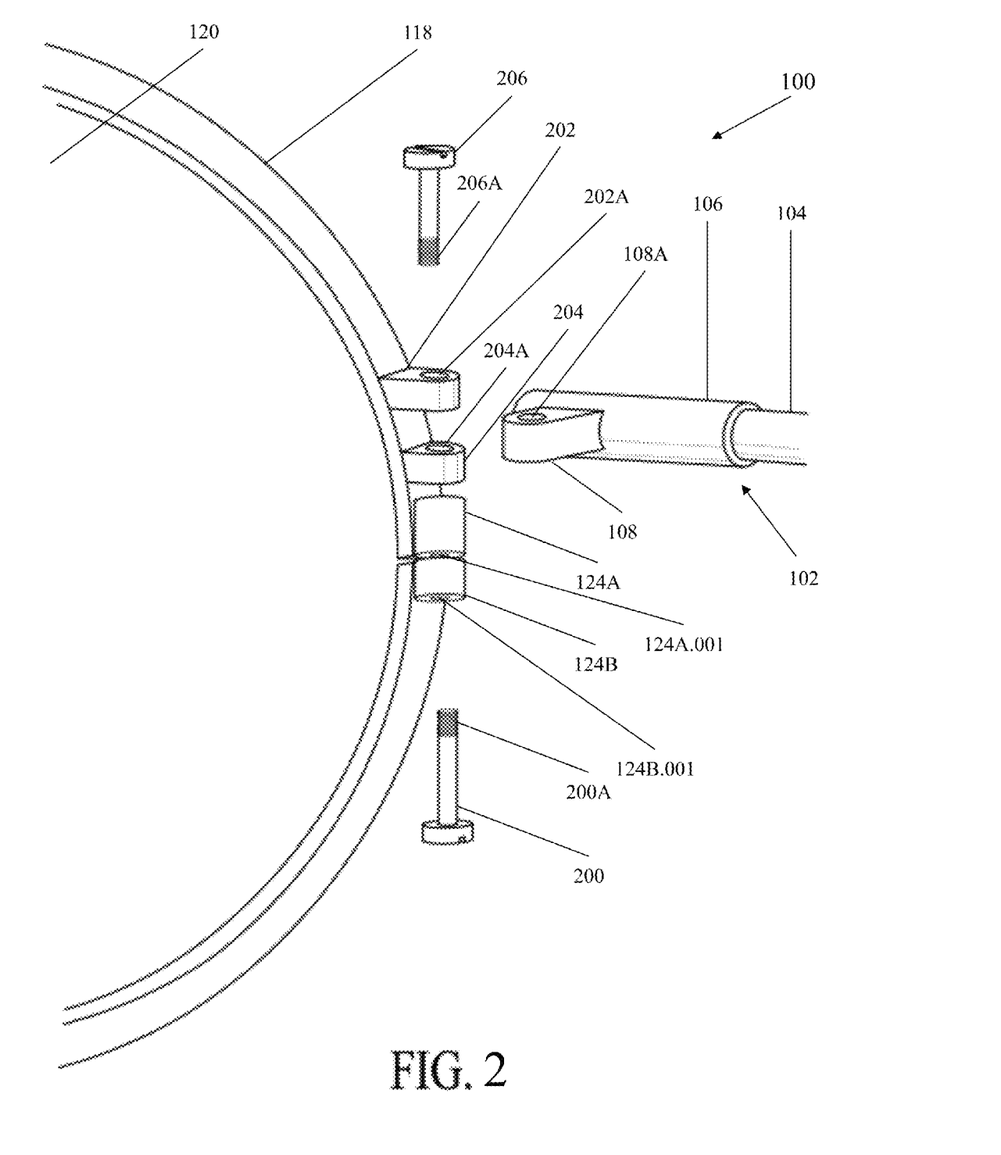
FIG. 2 is an exploded partial side view of the invented eyewear.

Referring now generally to the Figures and particularly to FIG. 2, FIG. 2 is an exploded partial view of the invented eyewear 100. In this view, the frame 118 is detached from the first temple assembly 102, allowing for a detailed view of the first frame screw assembly 124 and the first temple assembly 102. A first upper frame screw receiver 124A and a first lower frame screw receiver 124B are shown, the first upper frame screw receiver 124A having a first tapped frame aperture 124A.001 disposed substantively in the center; and the first lower frame screw receiver 124B having a first smooth frame aperture 124B.001 disposed substantively in the center.

In order to firmly couple the first upper frame screw receiver 124A and the first lower frame screw receiver 124B, a first frame screw 200 passes through the first smooth frame aperture 124B.001 of the first lower frame screw receiver 124B, and a threaded terminus 200A of the first frame screw 200 engages with the first tapped frame aperture 124A.001 of the first upper frame screw receiver 124A. When the first frame screw 200 is engaged, the first frame screw assembly 124 is enabled to firmly hold the first lens 120 in place. When the first frame screw 200 is disengaged from the first frame screw assembly 124, the frame 118 becomes loose enough for the first lens 120 to be removed from and/or replaced in the frame 118.

The first middle temple screw receiver 108 couples with a first upper temple screw receiver 202 and a first lower temple screw receiver 204 to allow the first temple assembly 102, when a first temple screw 206 is engaged, to be disposed in a position substantively perpendicular to the frame 118, when the invented eyewear 100 is in use, or substantively parallel to the frame 118, when the invented eyewear 100 is stored; the first temple assembly 102 may further be disposed at any reasonable angle falling between substantively parallel and substantively perpendicular to the frame 118.

The first middle temple screw receiver 108, the first upper temple screw receiver 202 and the first lower temple screw receiver 204 each contain an aperture disposed approximately in the center of each element. The first temple screw 206 optimally passes through a first smooth temple aperture 108A of the first middle temple screw receiver 108 and a second smooth temple aperture 202A of the first upper temple screw receiver 202. A threaded terminus 206A of the first temple screw 206 is received by and engages a first tapped temple aperture 204A of the first lower temple screw receiver 204. When the first temple screw 206 is engaged, the first temple assembly 102 is rotatably coupled to the frame 118.

The first frame screw 200 and the first temple screw 206 are optimally composed of a precious metal alloy which is stronger and which has a higher specific gravity than the precious metal alloy comprising the frame 118 and/or the first temple assembly 102 and the second temple assembly 110. In a non-limiting example, the frame 118 may optionally be composed of sterling silver, the first temple assembly 102 and the second temple assembly 110 may optionally be composed of gold, and the first temple screw 206 and the first frame screw 200 may preferably be composed of platinum.

Figure 3:
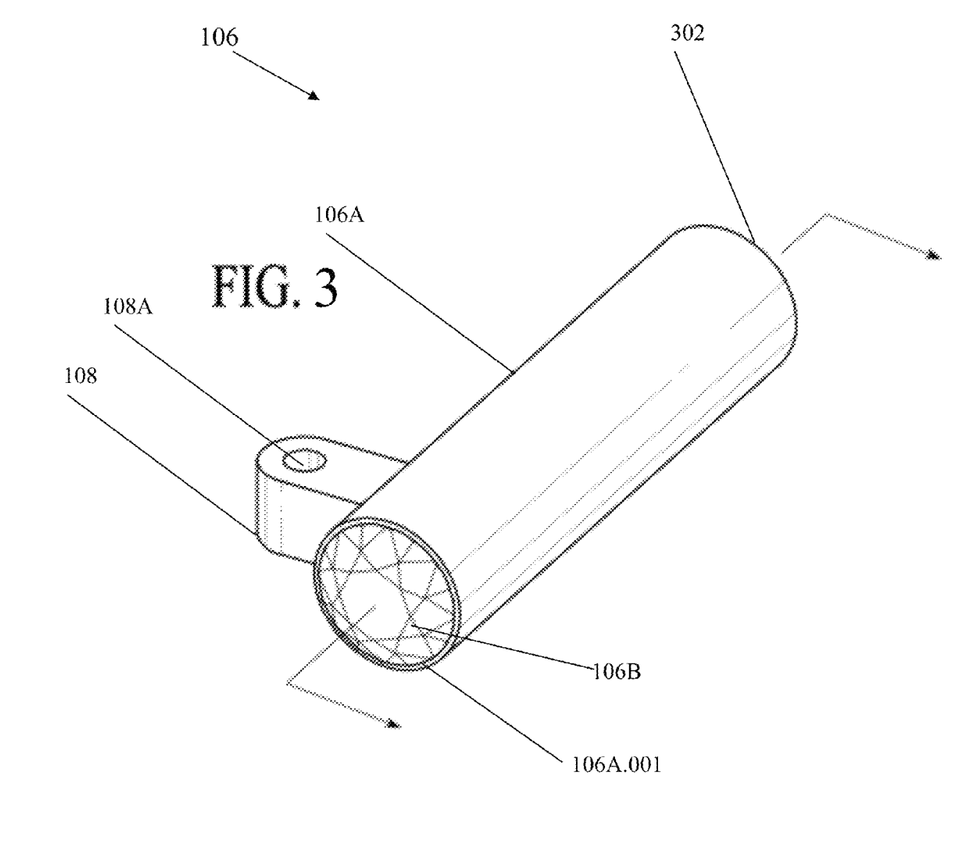
FIG. 3 is a close-up view of the an aspect of the invented eyewear, comprising a first jewel and a first jewel receiver.

Referring now generally to the Figures and particularly to FIG. 3, FIG. 3 is a close-up view of the first jewel element 106 of the invented eyewear 100, comprising a first jewel receiver 106A and a first jewel 106B. A first cavity 302 of the first jewel receiver 106A is preferably disposed surrounding the front of the first arm 104, as described in the text accompanying FIG. 1. The first arm 104 may be coupled with the first jewel element 106 by one or more suitable metal coupling methods and structures known in the art, to include (a.) application of an adhesive within the first cavity

302; (b.) by addition of a screw threading on an exterior of the first arm 104 positioned to engage with an optional tapped interior of the first cavity 302, wherein the optional threading of the first arm 104 and the optional tapped interior of the first cavity 302 are configured to enable mechanical engagement and disengagement; (c.) a friction fit of a length of the first arm 104 into the first cavity 302, wherein the length of the first arm 104 inserted into the first cavity 302 is oversized relative to the inner diameter of the first cavity 302; and/or (d.) additional one or more additional suitable coupling methods and structures known in the art.

The first jewel receiver 106A is securely coupled with the first jewel 106B by one or more suitable means or structures known in the art, such as, but not limited to, (a.) a bezel fitting of the first jewel 106B within the first jewel receiver 106A, (b.) application of an adhesive to adhere the first jewel 106B within the first jewel receiver 106A, (c.) the formation of a plurality of small beaded structures, each beaded structure extending from the interior of the first jewel receiver 106A, and a positioning of the plurality of small beaded structures to maintain the first jewel 106B within the first jewel receiver 106A, and/or (d.) one or more additional or alternate secure coupling means known in the art. It is understood that the one or more optional small beaded structures may include a spherical element having a diameter dimension preferably on the order of 0.5 millimeter plus or minus 0.1 millimeter.

In the preferred embodiment of the invented eyewear 100, the first jewel receiver 106A is comprised of a precious metal alloy, optionally an alloy of gold, silver, platinum and/or palladium. When applied to aspects of the invented eyewear 100, the designation "silver" may be assumed to include all types, grades and/or alloys of silver, including but not limited to pure silver and/or sterling silver. When applied to aspects of the invented eyewear 100, the designation "gold" may be assumed to include all types, grades, and/or alloys of gold, including but not limited to white gold, yellow gold, rose gold, pink gold, green gold, and/or purple gold. The precious metal alloy used to comprise the first jewel receiver 106A may optionally match the precious metal alloy comprising the frame 118 and/or the first temple assembly 102 and the second temple assembly 110.

The first jewel 106B may be any mineral ("gemstone") cut and polished for use in jewelry. A non-exhaustive list of gemstones may include, but is not limited to the following: garnet, amethyst, emerald, diamond, topaz, opal, ruby, and/or sapphire. Non-mineral gemstones, such as amber, may also comprise the first jewel.

Figure 4:
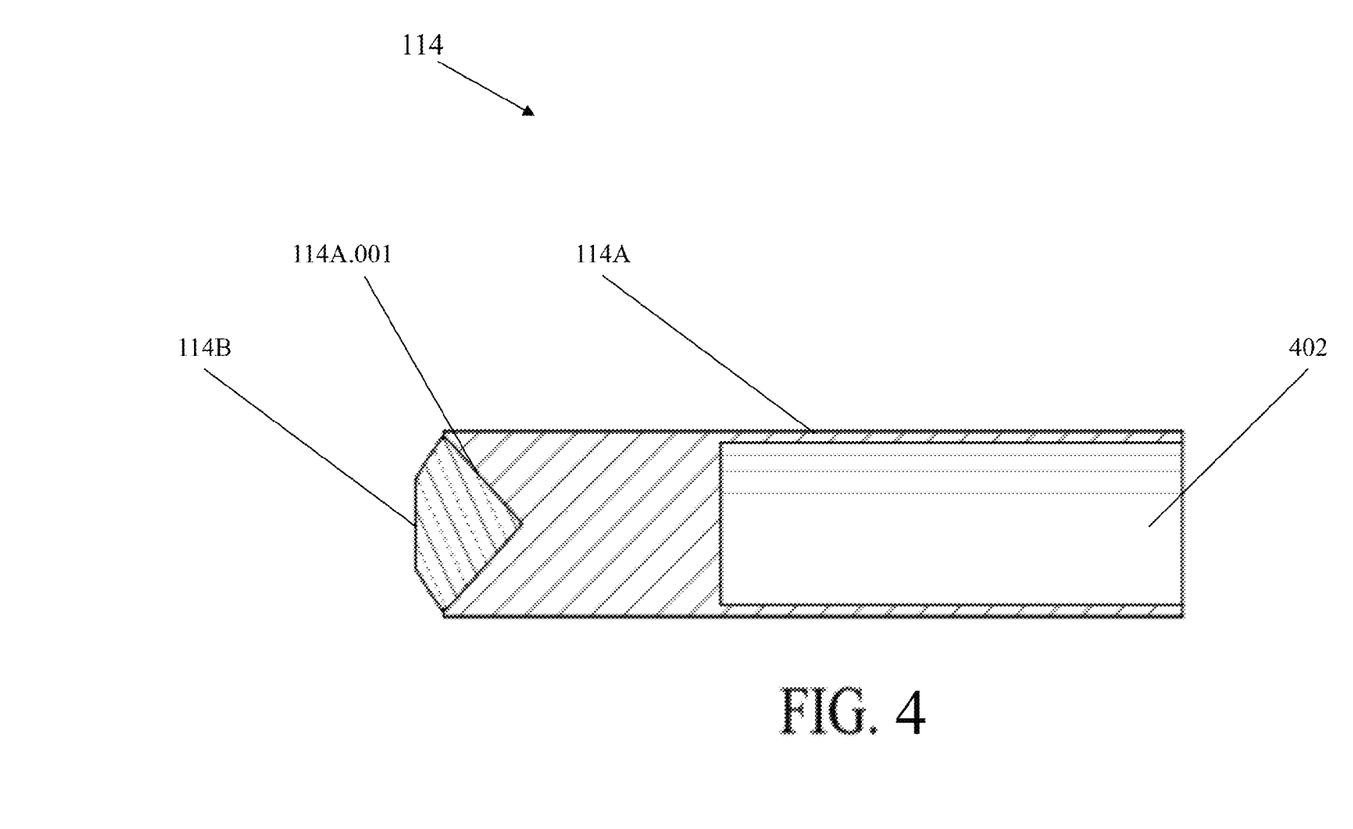
FIG. 4 is a cut away view of the first jewel receiver and/or the second jewel receiver.

Referring now generally to the Figures, and particularly to FIG. 4, FIG. 4 is a cut out view of the first jewel receiver 106A, or optionally of a second jewel receiver 114A. The cut out view of the first jewel receiver 106A and/or the second jewel receiver 114A shows the first cavity 302 or a second cavity 402 into which the first arm 102 (in the case of the first jewel receiver 106A) or the second arm 112 (in the case of the second jewel receiver 114A) may be securely partially inserted and coupled.

The second arm 112 may be coupled with the second jewel element 114 by one or more suitable metal coupling methods and structures known in the art, to include (a.) application of an adhesive within the second cavity 402; (b.) by addition of a screw threading on an exterior of the second arm 112 positioned to engage with a tapped interior of the second cavity 402, wherein the optional threading of the second arm 112 and the optional tapped interior of the second cavity 402 are configured to enable mechanical engagement and disengagement of the second arm 112 and the second jewel element; (c.) a friction fit of a length of the second arm 112 into the second cavity 402, wherein the length of the second arm 112 inserted into the second cavity 402 is oversized relative to the inner diameter of the second cavity 402; and/or (d.) one or more additional suitable coupling methods and structures known in the art.

The cut out view of the first jewel receiver 106A and/or the second jewel receiver 114A further shows the first jewel cavity 106A.001 by which the first jewel 106B may be securely inserted in to the first jewel receiver 106A or a second jewel cavity 114A.001 by which a second jewel 114B may be securely inserted into the second jewel receiver 114A.

The second jewel receiver 114A is securely coupled with the second jewel 114B by one or more suitable means or structures known in the art, such as, but not limited to, (a.) a bezel fitting of the second jewel 114B within the second jewel receiver 114A, (b.) application of an adhesive to adhere the second jewel 114B within the second jewel receiver 114A, (c.) the formation of a plurality of small beaded structures, each beaded structure extending from the interior of the second jewel receiver 114A, and a positioning of the plurality small beaded structures to maintain the second jewel 114B within the second jewel receiver 114A, and/or (d.) one or more additional or alternate secure coupling means known in the art. It is understood that the one or more optional small beaded structures may include a spherical element having a diameter dimension preferably on the order of 0.5 millimeter plus or minus 0.1 millimeter.

The second arm 112 may optionally be coupled to the second jewel element 114, by means of a friction fit, or alternately by means of an adhesive, or alternately by means of welding, or further optionally by means of a second tapped interior of the second jewel element 114 receiving and engaging with a threaded terminus 112A of the second arm 112.

In the preferred embodiment of the invented eyewear 100, the second jewel receiver 114A is comprised of a precious metal alloy, the precious metal alloy optionally comprising gold, silver, platinum and/or palladium. When applied to aspects of the invented eyewear 100, the designation "silver" may be assumed to include all types, grades and alloys of silver, including but not limited to pure silver and/or sterling silver. When applied to aspects of the invented eyewear 100, the designation "gold" may be assumed to include all types, grades, and/or alloys of gold, including but not limited to white gold, yellow gold, rose gold, pink gold, green gold, and/or purple gold. The precious metal alloy used to comprise the second jewel receiver 114A may optionally match the precious metal alloy comprising the frame 118 and/or the first temple assembly 102 and second temple assembly 110. The first jewel receiver 106A and the second jewel receiver 114A are optimally composed of the same precious metal alloy. For example, the frame 118 may optionally be comprised of gold, the first temple assembly 102 and second temple assembly 110 may optionally be comprised of sterling silver, and the first jewel receiver 106A and the second jewel receiver 114A may optionally be comprised of gold or sterling silver, dependent upon the aesthetic preference of the wearer.

The second jewel 114B may be any mineral ("gemstone") cut and polished for use in jewelry. A non-exhaustive list of possible gemstones may include, but is not limited to the following: garnet, amethyst, emerald, diamond, topaz, opal, ruby, and/or sapphire. Non-mineral gemstones, such as amber, may also comprise the second jewel 114B. The first jewel 106B and the second jewel 114B are preferably the same gemstone.

Figure 5A:
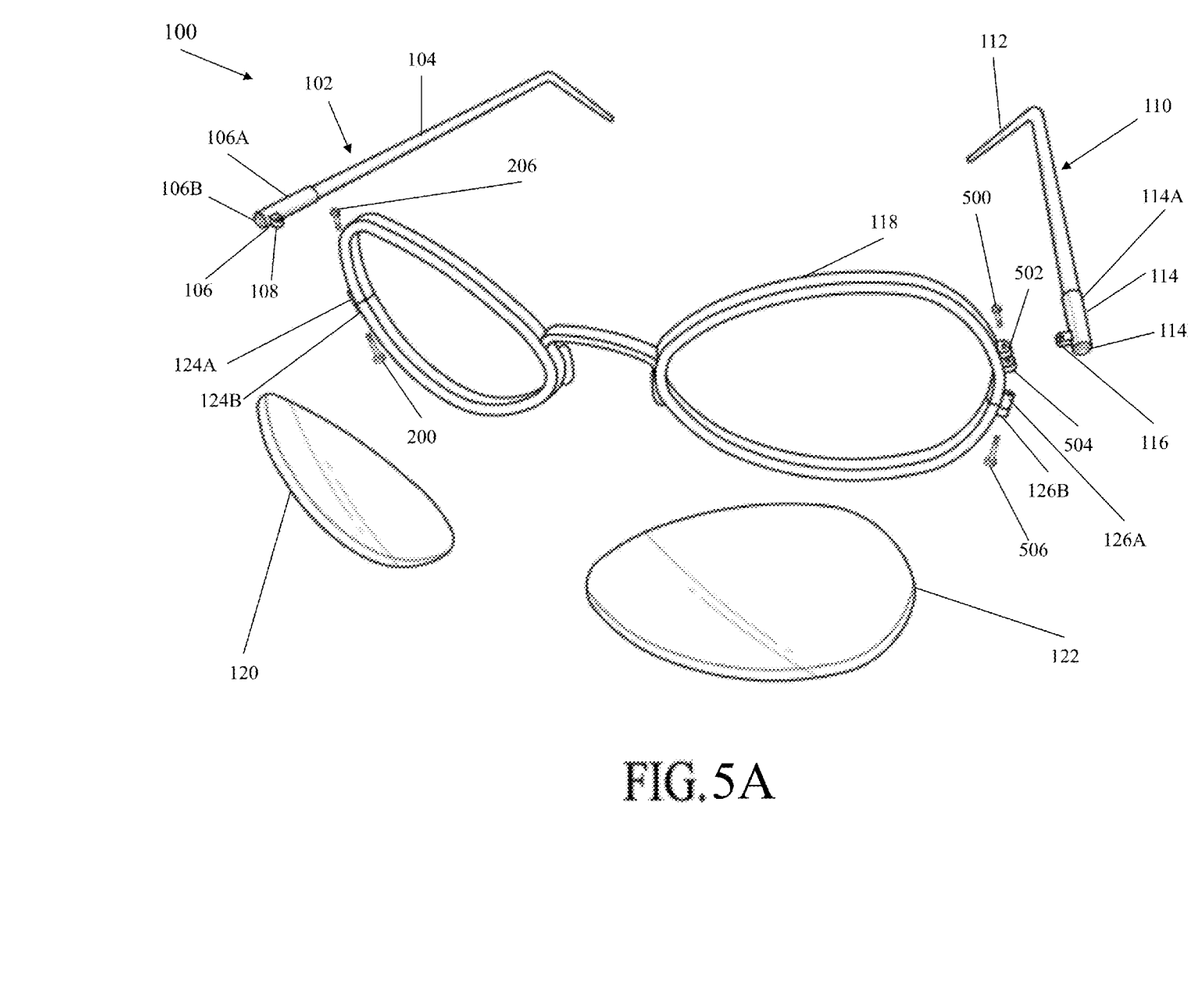
FIGS. 5A and 5B are exploded front views of the invented eyewear.
Figure 5B:
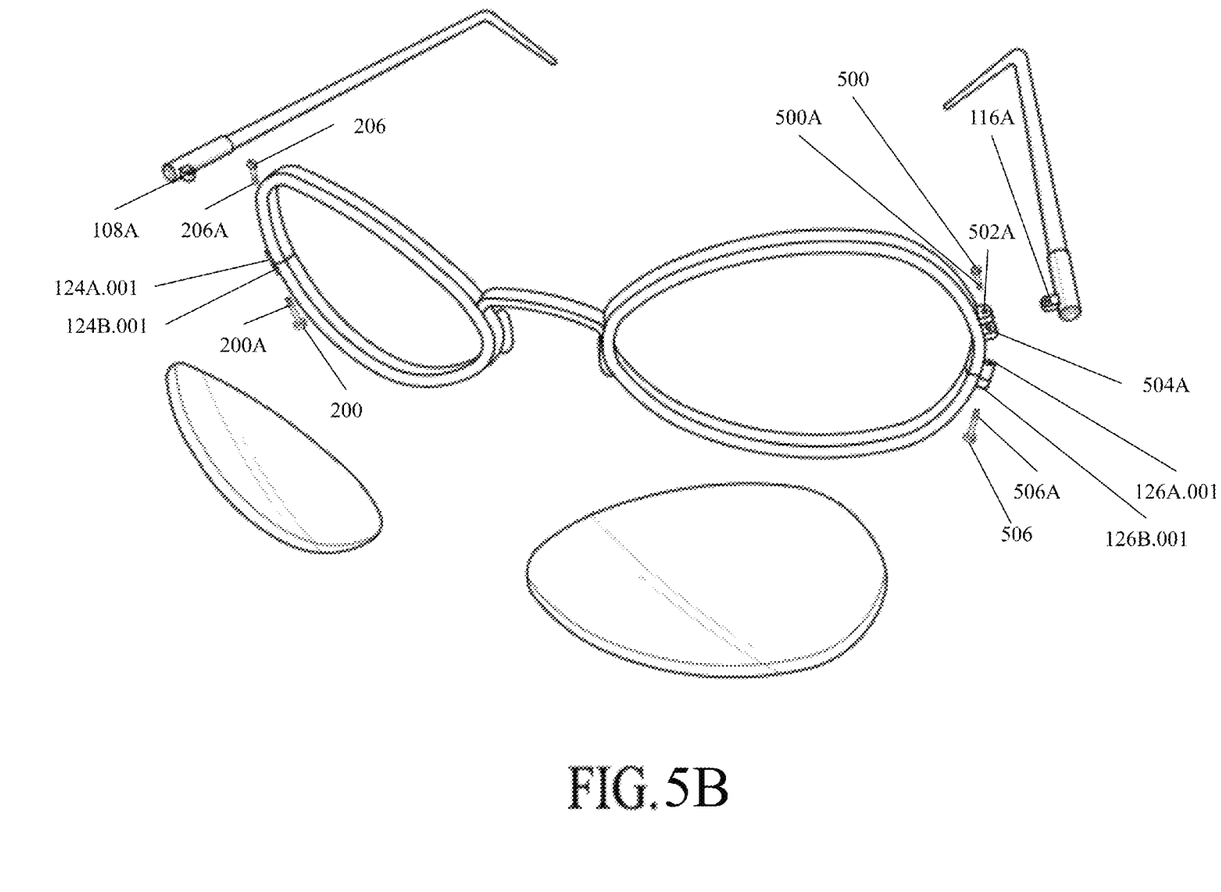

Referring now generally to the Figures, and particularly to FIG. 5A and FIG. 5B, FIG. 5A and FIG. 5B are exploded front views of the invented eyewear 100. It is understood that the elements of the invented eyewear 100 as presented in FIG. 5A are also present in the invented eyewear 100 as presented in FIG. 5B, but are not repeated, for the sake of clarity in the drawings. FIG. 5A and FIG. 5B represent the same preferred embodiment of the invented eyewear 100. The first temple assembly 102 and second temple assembly 110 are shown to be detached from the frame 118 by means of the removal of the first temple screw 206 from the first upper temple screw receiver 202, the first middle temple screw receiver 108 and the first lower temple screw receiver 204, and by means of the removal of a second temple screw 500 from a second upper temple screw receiver 502, the second middle temple screw receiver 116 and a second lower temple screw receiver 504, respectively. The first lens 120 may be removed from the frame 118 by decoupling the first frame screw 200 from the first frame screw assembly 124, through the first smooth frame aperture 124B.001 in the first lower frame screw receiver 124B and disengaging the threaded terminus 200A of the first frame screw 200 from the first tapped frame aperture 124A.001 in the first upper frame screw receiver 124A and by allowing the first lens 120 to slide free from the otherwise snug and secure grip of the frame 118. The second lens 122 may be removed from the frame 118 by decoupling a second frame screw 506 from the second frame screw assembly 126, by disengaging the threaded terminus 506A of the second frame screw 506 from a second tapped frame aperture 126A.001 in a second upper frame screw receiver 126A, removing the second frame screw 506 from the second smooth frame aperture 126B.001 in a second lower frame screw receiver 126B, and allowing the second lens 122 to slide free from the otherwise snug and secure grip of the frame 118.

The first jewel element 106 is shown securely affixed to the first arm 104, allowing the first arm 104 to rotatably couple with the frame 118 when the first temple screw 206 is disposed through the first smooth temple aperture 108A in the first middle temple screw receiver 108 and through the second smooth temple aperture 202A in the first upper temple screw receiver 202, and engaged within the first tapped temple aperture 204A in the first lower temple screw receiver 204. The second jewel element 114 is shown securely affixed to the second arm 112, allowing the second arm 112 to rotatably couple with the frame 118 when the second temple screw 500 is disposed through a third smooth temple aperture 116A in the second middle temple screw receiver 116 and through a fourth smooth temple aperture 502A of the second upper temple assembly element 502, and engaged with a second tapped temple aperture 504A in a second lower temple screw receiver 504. The first jewel 106B is securely affixed to the first jewel receiver 106A, and the second jewel 114B is securely affixed to the second jewel receiver 114A.

The second temple screw 500 and the second frame screw 506 are optimally comprised of a precious metal alloy which is stronger and which has a higher specific gravity than the precious metal alloy comprising the frame 118 and/or the first temple assembly 102 and the second temple assembly 110. For example, the frame 118 may optionally be comprised of sterling silver, the first temple assembly 102 and second temple assembly 110 may optionally be comprised of gold, the second temple screw 500 and second frame screw 506 may optionally be comprised of platinum. The precious metal alloy comprising the second temple screw 500 and the second frame screw 506 is, in the preferred embodiment, the same precious metal alloy comprising the first temple screw 206 and the first frame screw 200.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

I claim:

1. An eyewear apparatus comprising:
a frame adapted to house an optical element, the frame substantially comprised of a first precious metal alloy;
a first temple, the first temple substantially comprised of a second precious metal alloy; and
a first coupling element, the first coupling element adapted to rotatably couple the frame and the first temple, wherein the first coupling element comprises a precious metal material and the precious metal material is both harder than and has a higher specific gravity than the frame material and the precious metal material is both harder than and has a higher specific gravity than the first temple material.

2. The apparatus of claim 1, wherein the first precious metal alloy and the second precious metal alloy are substantively similar.

3. The apparatus of claim 1, wherein the frame and the temple each comprise a precious metal alloy selected from the group of precious metals consisting of gold, titanium, silver, platinum, and palladium.

4. The apparatus of claim 1, wherein the first coupling element comprises a precious metal alloy selected from the group of precious metals consisting of gold, titanium, silver, platinum, rhodium and palladium.

5. The apparatus of claim 4, wherein the first coupling element comprises gold alloy of at least nine karat gold.

6. The apparatus of claim 5, wherein the first coupling element comprises a palladium alloy having at least 50% purity of palladium.

7. The apparatus of claim 5, wherein the first coupling element comprises a platinum alloy having at least 50% purity of platinum.

8. The apparatus of claim 5, wherein the first coupling element comprises a gold alloy selected from the group of gold alloys consisting of white gold, yellow gold, rose gold, pink gold, green gold, and purple gold.

9. The apparatus of claim 4, wherein the frame and the first temple comprise silver.

10. The apparatus of claim 9, wherein the frame comprises sterling silver.

11. The apparatus of claim 9, wherein the first temple comprises sterling silver.

12. The apparatus of claim 4, wherein the first coupling element comprises an elongate coupling element composed of a third precious metal alloy.

13. The apparatus of claim 12, wherein the elongate coupling element comprises a screw.

14. The apparatus of claim 1, wherein the frame comprises a closure element composed of a precious metal alloy, the closure element adapted to alternately enable the frame to retain and release the optical element.

15. The apparatus of claim 14, wherein the closure element comprises the precious metal material comprised within the first coupling element material and the precious metal material is harder than and has a higher specific gravity than the frame material.

16. The apparatus of claim 15, wherein the precious metal material comprises gold alloy of at least nine karat gold.

17. An eyewear apparatus comprising:
- a frame adapted to house an optical element, the frame substantially comprised of a first precious metal alloy;
- a first temple, the first temple substantially comprised of a second precious metal alloy;
- a first coupling element, the first coupling element adapted to rotatably couple the frame and the first temple, wherein the first coupling element comprises a precious metal material and the precious metal material is both harder than and has a higher specific gravity than the frame material and the precious metal material is both harder than and has a higher specific gravity than the first temple material;
- a second temple, the second temple substantially comprised of the second precious metal alloy;
- a second coupling element, the second coupling element adapted to rotatably couple the frame and the second temple, wherein the second coupling element comprises the precious metal material and the precious metal material is both harder than and has a higher specific gravity than the frame material and the precious metal material is both harder than and has a higher specific gravity than the second temple material.

18. The apparatus of claim 17, wherein the frame and the temples each comprise a precious metal alloy selected from the group of precious metals consisting of gold, titanium, silver, platinum, rhodium and palladium.

19. The apparatus of claim 18, wherein the first coupling element and the second coupling element each comprise a precious metal alloy selected from the group of precious metals consisting of gold, rhodium, titanium, silver, platinum, and palladium.

20. The apparatus of claim 19, wherein the first coupling element and the second coupling element each comprise gold alloy of at least nine karat gold.

21. The apparatus of claim 20, wherein the frame comprises sterling silver.

22. The apparatus of claim 21, wherein the first temple and the second temple each comprise sterling silver.

23. The apparatus of claim 17, wherein the first coupling element and the second coupling element each comprise a palladium alloy having at least 50% purity of palladium.

24. The apparatus of claim 17, wherein the first coupling element and the second coupling element comprise a platinum alloy having at least 50% purity of platinum.

25. An eyewear apparatus comprising:
- a frame adapted to house an optical element, the frame substantially comprised of a first precious metal alloy;
- a first temple, the first temple including a jewel element and substantially comprised of a second precious metal alloy; and
- a first coupling element, the first coupling element adapted to rotatably couple the frame and the first temple, wherein the first coupling element comprises a precious metal material and the precious metal material is both harder than and has a higher specific gravity than the frame material and the precious metal material is both harder than and has a higher specific gravity than the first temple material.

* * * * *